(12) United States Patent
Rokne et al.

(10) Patent No.: US 12,366,136 B2
(45) Date of Patent: Jul. 22, 2025

(54) VALVE OPERATING DEVICE AND METHOD OF OVERRIDING A MALFUNCTIONING VALVE OPERATING DEVICE

(71) Applicant: FMC Kongsberg Subsea AS, Kongsberg (NO)

(72) Inventors: Øivind Rokne, Notodden (NO); Heyn Halfdan Magnus, Kongsberg (NO)

( * ) Notice: Subject to any disclaimer, the term of this patent is extended or adjusted under 35 U.S.C. 154(b) by 0 days.

(21) Appl. No.: 18/566,613

(22) PCT Filed: Jun. 24, 2022

(86) PCT No.: PCT/EP2022/067314
§ 371 (c)(1),
(2) Date: Dec. 1, 2023

(87) PCT Pub. No.: WO2023/274865
PCT Pub. Date: Jan. 5, 2023

(65) Prior Publication Data
US 2024/0254858 A1    Aug. 1, 2024

(30) Foreign Application Priority Data

Jun. 29, 2021 (NO) .................................. 20210834

(51) Int. Cl.
*E21B 34/04* (2006.01)
*F16K 31/50* (2006.01)

(52) U.S. Cl.
CPC ............ *E21B 34/04* (2013.01); *F16K 31/508* (2013.01)

(58) Field of Classification Search
CPC .............................. E21B 34/04; F16K 31/508

USPC ........................................................ 166/335
See application file for complete search history.

(56) References Cited

U.S. PATENT DOCUMENTS

| 3,371,545 A | * | 3/1968 | McNeal, Jr. ............ F16K 31/05 74/89.36 |
| 4,844,407 A | | 7/1989 | Baker |
| 4,964,613 A | * | 10/1990 | Logman .................. F16K 31/50 74/552 |
| 2007/0104547 A1 | | 5/2007 | Russell |
| 2017/0067573 A1 | | 3/2017 | Herman et al. |
| 2020/0049274 A1 | | 2/2020 | Hackney Kusmertz et al. |

FOREIGN PATENT DOCUMENTS

WO   WO-2016106101 A1 *  6/2016  ............ E21B 34/02
WO       2019/141595 A1    7/2019

* cited by examiner

*Primary Examiner* — Tara Schimpf
*Assistant Examiner* — Patrick F Lambe

(57) ABSTRACT

A valve operating device (1) for operating a subsea valve (100), the valve operating device (1) comprises:—a housing (10);—thrust bearings (12) supported by the housing (10);—a chamber (20) within the housing (10), wherein the chamber (20) comprises a first part of a linear guide (21);—a rotational shaft (30) comprising a first end with an external interface (31) outside the chamber (20) and a second end inside the chamber (20),—a linear shaft (40) arranged within the chamber (20), the linear shaft (40) comprising a first portion (41) and a second portion (42), wherein the first portion (41) comprises threaded portion (43) connected to the threaded portion (34) of the rotational shaft (30) and wherein—the rotational shaft (30) comprises a pre-machined hole (36) extending over a part of an axial length of the rotational shaft (30).

14 Claims, 8 Drawing Sheets

VALVE OPERATING DEVICE AND METHOD OF OVERRIDING A MALFUNCTIONING VALVE OPERATING DEVICE

The invention relates to a valve operating device for operating a subsea valve. The subsea valve may be in a valve tree above a subsea well or the valve operating device can operate or can be connected to a subsea valve on a flow line, or a valve on a manifold.

The invention further relates to a method of overriding a malfunctioning valve operating device.

BACKGROUND OF THE INVENTION

Normally actuators are used in a variety of applications, such as in operating subsea valves. The actuators normally have all required functions necessary to operate the valve, including a system for receiving a control signal for operating the valve as well as a source of energy. The control signal may be of relatively low energy and may, at least for subsea use, be e.g. electric voltage or current, pneumatic, or hydraulic fluid pressure. The energy source may be an electric current, hydraulic pressure, or pneumatic pressure. When the energy source receives a control signal, an actuator responds by converting the source's energy into mechanical motion thereby operating the valve.

Subsea X-mas trees normally comprise a number of pressure-tight fluid-barriers ensuring that the fluid and thus the pressure in the well is kept under control. However, from time to time the X-mas trees need maintenance or need to be pulled to surface for other reasons. In such situations, the barriers formed by the X-mas trees against uncontrolled release of well fluids are removed and have to be replaced by other temporary barriers. Such temporary barriers are normally installed in pressure containing bores below the X-mas tree, and this is done by accessing the area below the X-mas tree through dedicated bores in the X-mas tree. Accessibility to the well through the dedicated bores is allowed or restricted using one or more valves arranged at different locations of the individual dedicated bores. The valves, such as e.g. gate valves, normally move between two operating positions, which two positions corresponds to a) an open position of the valve where the bore is open (i.e. the area below the valve is accessible), and b) a closed position of the valve where the bore is closed (i.e. the area below the valve is not accessible).

For tree retrieval it is necessary to have access through vertical bore(s) and to be able to vent eventual pressure in annulus.

It is an objective of the invention to be able to operate a valve to an open position in case of failure of the operating mechanism in order to secure access to the area below the valve.

SUMMARY OF THE INVENTION

The invention is set forth in the independent claims, while the dependent claims define other characteristics of the invention.

The valve operating device and methods of overriding it may provide a solution for opening a valve to get access to the well below in case the valve operating device malfunctions. The override solutions provided herein are thus only used in case all other operating procedures for opening the valve fails. In other words, in case an operator is unsuccessful in opening, e.g. a valve to gain access to a well below the valve, and all attempts for normal operation of the valve operating device fails, the solution and methods described herein may be used as a final solution to open the valve. Once the valve operating device has been subject to the described methods herein, it is not able to perform its required function anymore and the tree has to be retrieved. I.e. the overriding solution is irreversible.

The override solution according to the invention provides a setup and methods for machining out a core of a rotational shaft, e.g. an operator spindle, of a valve operating device which ensures that the rotational shaft separates in two parts such that a valve connected to the shaft can be operated even if the valve operating device malfunctions.

It is described a valve operating device for operating a subsea valve, the valve operating device comprises:
  a housing;
  thrust bearings supported by the housing, wherein the thrust bearings comprises a connection part;
  a chamber within the housing, wherein the chamber comprises a first part of a linear guide;
  a rotational shaft comprising a first end with an external interface outside the chamber and a second end inside the chamber, the rotational shaft comprises a first portion that comprises a connection part which is connected to the connection part of the thrust bearings forming a connection therebetween which allows rotational movement of the rotational shaft while preventing axial movement of the rotational shaft relative to the housing, a second portion comprising a threaded portion, and an intermediate portion between the first portion and the second portion, and wherein the second portion is arranged inside the chamber;
  a linear shaft arranged within the chamber, the linear shaft comprising a first portion and a second portion, wherein the first portion comprises threaded portion interacting with the threaded portion of the rotational shaft forming a threaded connection translating rotational movement of the rotational shaft to linear movement of the linear shaft, and the second portion is connectable to a valve stem operating the valve, wherein the linear shaft also comprises a second part of the linear guide, the first part and the second part of the linear guide prevent rotation of the linear shaft relative to the housing, and wherein
  the rotational shaft comprises a pre-machined hole extending from the first end of the rotational shaft and along a center axis of the rotational shaft over a part of an axial length of the rotational shaft.

The linear shaft can be a spindle.

The connection parts of the thrust bearings and the rotational shaft are preferably complementary shaped. For example, the connection part of the thrust bearings may be a recess and the connection part of the rotational shaft can be a complementary shaped rib. Alternatively, the connection part of the thrust bearings may be a rib and the connection part of the rotational shaft can be a complementary shaped recess. In this latter example, the recess in the first portion of the rotational shaft may function as a weakened part of the rotational shaft.

The valve operating device is preferably connectable to an actuator, e.g. an electric actuator. The actuator typically has a rotating interface towards the external interface of the rotational shaft. The valve operating device is thus configured to convert rotational movement from a valve actuator connectable to the external interface to a linear movement of the valve stem.

The threaded connection formed by the threaded portion of the rotational shaft and the threaded portion of the linear shaft translates rotational movement of the rotational shaft to linear movement of the linear shaft. The rotational movement of the rotational shaft may be formed by rotation of the actuator.

In one aspect, the first portion of the linear shaft may encircle the second portion of the rotational shaft. The threaded portion of the linear shaft may be internal threads and the threaded portion of the rotational shaft may be external threads.

In another aspect, the second portion of the rotational shaft may encircle the first portion of the linear shaft. The threaded portion of the linear shaft may then be internal threads and the threaded portion of the rotational shaft may be external threads.

The valve operating device may operate a valve in a subsea valve tree. The subsea valve tree may be an electric tree, as well as a so-called all electric subsea valve tree. An all-electric subsea valve tree form part of an all-electric subsea well. The all-electric subsea well is defined as comprising an electric subsea valve tree (i.e. X-mas tree), electric downhole safety valve, and associated subsea control modules, where valve control is established via an electric cable.

Alternatively, the valve operating device can operate or can be connected to a subsea valve on a flow line, or a valve on a manifold.

In order to prevent rotation, the first and second part of the linear guide can form a key or spline connection.

The pre-machined hole extends from the first end of the rotational shaft, i.e. from the external interface for connection to e.g. an actuator, and along a center axis of the rotational shaft. The pre-machined hole facilitates machining of a core of the rotational shaft in that it may serve as a guide for a machining tool during machining such as drilling or milling.

The part of the axial length of the rotational shaft that the pre-machined hole extend, may preferably be the length from the first end and to or past the connection part of the rotational shaft.

The rotational shaft may form a sealing connection to the housing. The first portion of the rotational shaft may via a sealing gland on the rotational shaft be received in a groove in the housing (or vice versa).

The intermediate portion may comprise a weakened part. The weakened part may be positioned on a part of the intermediate portion which is within the inner chamber.

The weakened part may be formed by a reduction in an outer diameter of the rotational shaft. By reducing the diameter of the rotational shaft at the weakened part, i.e. by providing a "weak link" in the rotational shaft, it may be easier to break or separate the rotational shaft in case an override operation is required.

The connection part of the rotational shaft may be a recess with a reduced diameter and the weakened part may be formed by the recess. I.e., the recess may form the weakened part.

The weakened part may be arranged at the connection part of the rotational shaft or at a position further away from the external interface than the connection part of the rotational shaft. By arranging the weakened part at any of these positions, the operator is insured, in case of an override operation, that the rotational shaft breaks or separates at a position where the connection between the connection part on the thrust bearings and the connection part on the rotational shaft no longer prevents axial movement of the rotational shaft. By ensuring that the rotational shaft separates closer to the valve than the thrust bearings, the probability of a successful override of the valve operating device is increased because the operator then knows that there are no longer any axial obstructions preventing movement of the rotational shaft, and thus, the valve stem connected to the valve can be pushed enabling override operation of the valve to a desired position. It may be advantageous to position the weakened part further away from the external interface than the connection part of the rotational shaft, but as close to the connection part of the rotational shaft for any later override machining operation to be as short as possible.

Alternatively, the rotational shaft may be formed of three separate parts, where the middle part, i.e. the intermediate portion, may be formed of a different material than the two end parts of the rotational shaft. The middle part may be of a more brittle and/or a weaker material such that upon machining through the core of the rotational shaft, the middle part breaks before the two end parts ensuring that the override functionality can be obtained. The middle part may then function as a weak link for the rotational shaft.

It is further described a method of overriding a malfunctioning valve operating device as defined above, wherein the method comprises the steps of:
  connecting a machining unit with a machining tool to the external interface of the rotational shaft;
  machining a hole in a core of the rotational shaft guided by the pre-machined hole from the external interface and along the pre-machined hole at least until a tip of the machining tool is at or close to the connection between the connection part of the thrust bearings and the connection part of the rotational shaft;
  releasing the second portion of the rotational shaft from the first portion of the rotational shaft and thus the outer housing thereby allowing linear movement of the rotational shaft;
  pushing onto a bottom of the machined hole in the core of the rotational shaft, and thus the valve stem connected to the valve, until the valve is operated to a desired position.

The desired position can be an open or closed position depending of valve configuration, i.e. normally open or normally closed valve. For example, the desired position can be an open position such as to secure access to the well below the valve tree.

In one aspect, the machining unit can be a drilling unit and the machining tool can be a drill bit. In another aspect, the machining unit can be a milling unit and the machining tool can be a milling tool.

It is further described a subsea valve tree comprising a subsea valve and a valve operating device as described above.

The term "releasing the second portion of the rotational shaft from the first portion of the rotational shaft and thus the outer housing" involves breaking the material of the rotational shaft such that the second portion physically separates from the first portion of the rotational shaft. When the second portion separates from the first portion it is consequently released from its engagement with the thrust bearings and the housing and is free to move axially relative the first portion and the thrust bearings.

The step of releasing the second portion of the rotational shaft from the first portion of the rotational shaft may comprise:
  providing a hydraulic override pushing tool with a stroke piston and bringing an end of the stroke piston in contact with the bottom of the machined hole, and
  stroking the stroke piston onto the bottom of the machined hole until the rotational shaft breaks or separates.

Alternatively, the step of releasing the second portion of the rotational shaft from the first portion of the rotational shaft may comprise:

stroking the machining tool onto the bottom of the machined hole until the rotational shaft breaks or separates.

In yet a further alternative, the step of releasing the second portion of the rotational shaft from the first portion of the rotational shaft may comprise:

machining out the core until the second portion is separated from the first portion.

The method may comprise, prior to the step of connecting the machining unit with a machining tool to the external interface of the rotational shaft, a step of:

removing an actuator and/or a motor connected to the external interface.

The step of removing the actuator may be necessary in order to make space for connection of the machining unit to the external interface.

It is further described a subsea valve tree comprising a subsea valve and a valve operating device as defined above.

It is further described a valve operating device for operating a subsea valve, the valve operating device comprises:
a housing;
thrust bearings supported by the housing, wherein the thrust bearings comprises a connection part;
a chamber within the housing, wherein the chamber comprises a first part of a linear guide;
a rotational shaft comprising a first end with an external interface outside the chamber and a second end inside the chamber, the rotational shaft comprises a first portion that comprises a connection part which is connected to the connection part of the thrust bearings forming a connection therebetween which allows rotational movement of the rotational shaft while preventing axial movement of the rotational shaft relative to the housing, a second portion comprising a threaded portion, and an intermediate portion between the first portion and the second portion, and wherein the second portion is arranged inside the chamber;
a linear shaft arranged within the chamber, the linear shaft comprising a first portion and a second portion, wherein the first portion comprises threaded portion interacting with the threaded portion of the rotational shaft forming a threaded connection translating rotational movement of the rotational shaft to linear movement of the linear shaft, and the second portion is connectable to a valve stem operating the valve, wherein the linear shaft also comprises a second part of the linear guide, the first part and the second part of the linear guide prevent rotation of the linear shaft relative to the housing, and wherein the intermediate portion comprises a weakened part.

Features of the weakened part may be similar to the features described in relation to the weakened part above.

The relative terms "upper", "lower", "below", "above", "higher" etc. shall be understood in their normal sense and as seen in a cartesian coordinate system. When mentioned in relation to seabed, "upper" or "above" shall be understood as a position closer to the water surface (relative to another component), contrary to the terms "lower" or "below" which shall be understood as a position further away from the water surface (relative another component).

It is obvious for the person skilled in the art that the different features in the different aspects or embodiments may be combined in any way.

BRIEF DESCRIPTION OF THE FIGURES

The invention will now be described in non-limiting embodiment, with reference to the accompanying Figures wherein.

DETAILED DESCRIPTION OF THE FIGURES

In the following, the invention will be described in greater detail.

Figure 1:
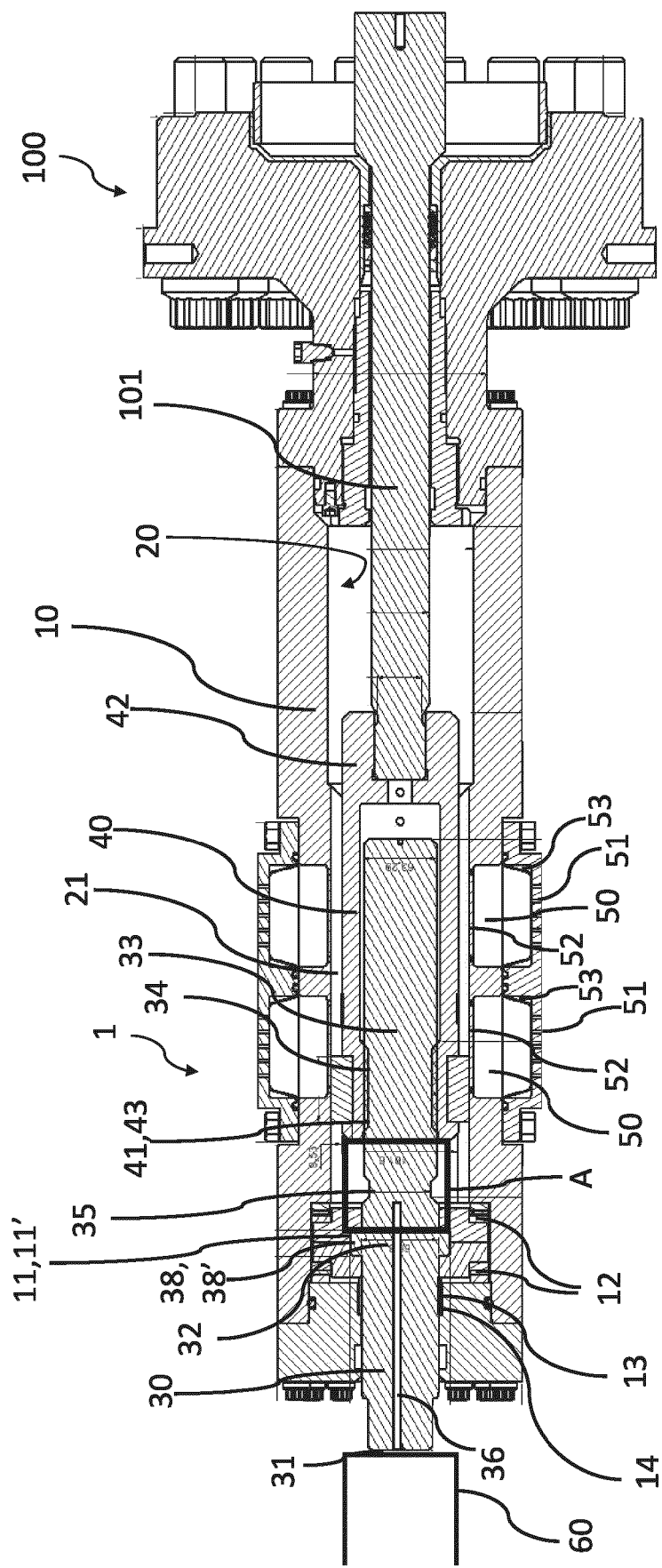
FIG. 1 shows a valve operating device according to the invention where the rotational shaft is an inner shaft with external threads and the linear shaft is an outer shaft with internal threads.

FIG. 1 shows a valve operating device 1 according to the invention where the rotational shaft 30 is an inner shaft with external threads and the linear shaft 40 is an outer shaft with internal threads. The valve operating device 1 is configured to operate a subsea valve 100 of a valve tree for a subsea well (valve tree and subsea well shown in FIG. 6). On the left-hand side of the Figure, an electric actuator 60 providing energy to the valve operating device 1 is shown. The electric valve actuator 60 typically has a rotational output for connection to an external interface 31 of the valve operating device 1. Although an electric actuator 60 is shown, other energy sources are also possible.

The valve operating device 1 comprises a housing 10. The housing 10 comprises a chamber 20. The chamber 20 has a longitudinal extension and comprises a linear guide 21. Thrust bearings 12 is are supported by the housing 10 and comprise a connection part 11. The connection part 11 in FIG. 1 is shown as a recess 11'.

The valve operating device 1 further comprises a rotational shaft 30 comprising a first end with an external interface 31 outside the chamber 20. The actuator 60 is disclosed connected to the external interface 31. A second end of the rotational shaft 30 is arranged inside the chamber 20. The rotational shaft 30 is disclosed with a first portion 32 forming a sealing connection with the housing 10 via sealing gland 14 on the rotational shaft 30 received in groove 13 in the housing 10.

The rotational shaft 30 comprises a first portion 32 that comprises a connection part 38 in the form of a radial rib 38' which is connected to the connection part 11 in the form of a recess 11' of the thrust bearings 12 forming a connection therebetween. The connection allows rotational movement of the rotational shaft 30 while preventing axial movement of the rotational shaft 30 relative to the thrust bearings 12 and the housing 10. The rotational shaft 30 further comprises a second portion 33 comprising a threaded portion 34, and an intermediate portion between the first portion 32 and the second portion 33. The threaded portion 34 is exterior threads 34. The second portion 33 is disposed within the chamber 20.

The intermediate portion is disclosed with a weakened part 35. The rotational shaft 30 is shown with a main outer diameter having substantially the same outer diameter over the whole axial length thereof, however the weakened part 35 in the intermediate portion is disclosed with a smaller outer diameter compared to the main outer diameter. Section A in FIG. 1 indicates the area where the weakened part 35 may be provided on the rotational shaft 20 in order to ease separation of the rotational shaft 30 in the event of an override operation. The weakened part 35 thus enables release of the second portion 33 of the rotational shaft 30 relative the first portion 32 of the rotational shaft 30. As seen, section A represents the possible area of the weakened part 35 extending from the engagement of the first portion 32 to the thrust bearings 12 and to the threaded portion 34 of the rotational shaft 30.

The valve operating device 1 further comprises a linear shaft 40 arranged within the chamber 20. The linear shaft 40 is guided by the linear guide 21 in the chamber 20. The linear guide 21 prevents rotation of the linear shaft 40 relative the housing 10, e.g. the linear guide 21 may form a spline connection with the linear shaft 40. The linear shaft 40 comprises a first portion 41 and a second portion 42. The first portion 41 comprises a threaded portion 43. The threaded portion 43 may be interior threads 43 connected to the exterior threads 34 on the second portion 33 of the rotational shaft 30 forming a threaded connection translating rotational movement of the rotational shaft 30 to linear movement of the linear shaft 40. The second portion 42 of the linear shaft 40 is shown connected to a valve stem 101 operating the valve 100.

In order to function as a guide for a machining unit 200 with a machining tool 201 in case using the override functionality (see e.g. FIGS. 2 and 4) is required, the rotational shaft 30 is provided with a pre-machined hole 36 extending from the first end (i.e. the external interface 31) of the rotational shaft 30 and along a center axis of the rotational shaft 30 over a part of an axial length of the rotational shaft 30. As seen in FIG. 1, the pre-machined hole 36 may extend to the weakened part 35.

In order to compensate for hydrostatic pressure of the seawater experienced on the valve 100, the disclosed valve operating device 1 is shown with a system for pressure equalizing the chamber 20 such that the valve operating device 1 does not have to work against force formed by the weight of the hydrostatic column of seawater. This system may comprise one or more bellows chambers 50 in pressure communication with the surrounding seawater via outer drainage holes 51 and with the chamber 20 via inner drainage holes 52. The bellows 53 inside the bellows chambers 50 ensures that seawater is prevented from entering into the chamber 20. If seawater enters the inner chamber 20, the valve operating device 1 will probably decrease its operational life due to corrosion of the components inside chamber 20.

Figure 2:
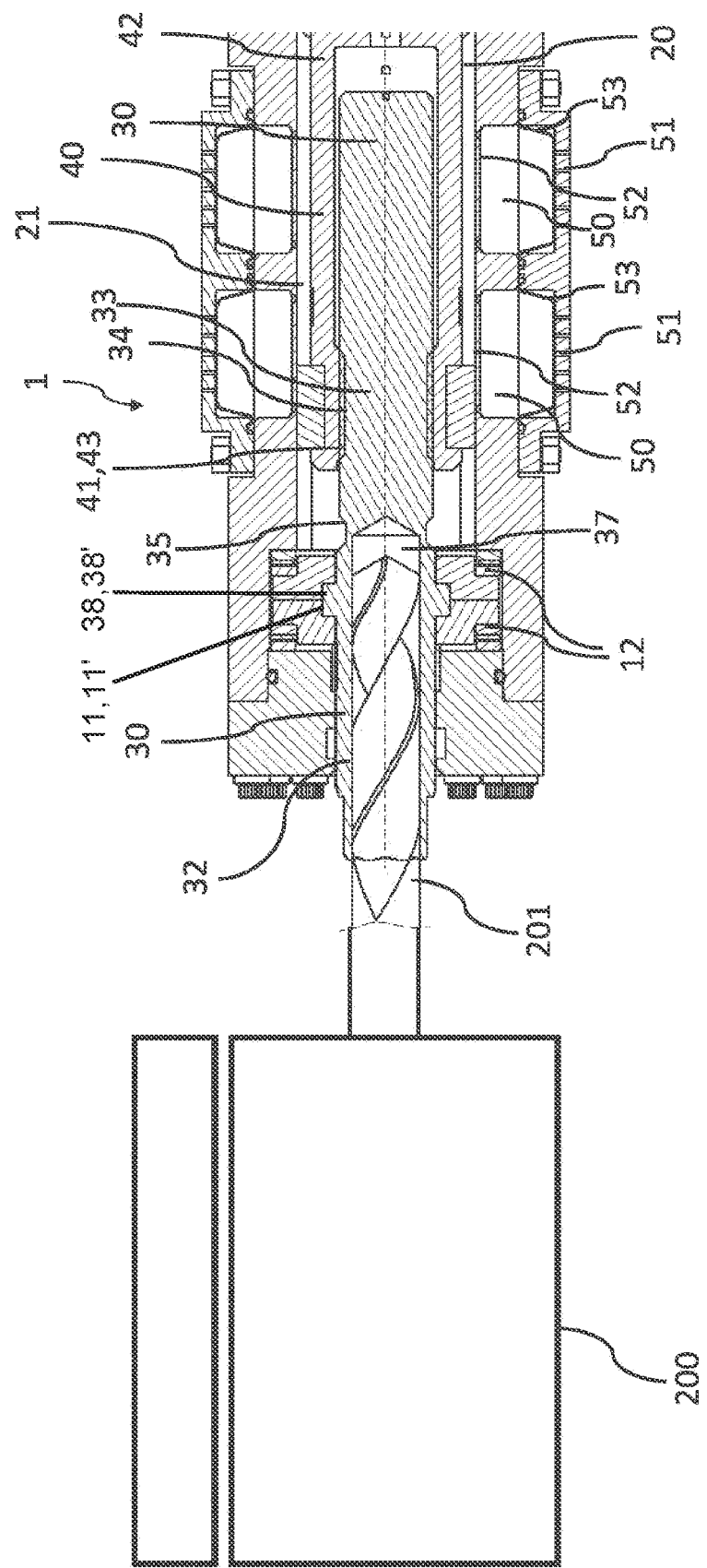
FIG. 2 shows a first method of overriding the valve operating device in FIG. 1 by releasing a second portion of a rotational shaft from a first portion of the rotational shaft using a machining unit both for machining out a core of the rotational shaft and stroking of the rotational shaft.

FIG. 2 shows a first method of overriding the valve operating device 1 in FIG. 1 by releasing the second portion 33 of the rotational shaft 30 from a first portion 32 of the rotational shaft 30 using the same machining unit 200 for machining out a core of the rotational shaft 30 and stroking of the rotational shaft 30. When comparing FIG. 2 with FIG. 1, it is seen that a machining tool 201 in the form of a drill bit 201 connected to the machining unit 200 in the form of a drilling unit 200 has drilled out a core of the rotational shaft 30 forming a machined hole 37 in the form of a drilled hole 37 in the rotational shaft 30. The drilled hole 37 extends from the external interface 31 towards the weakened part 35. As shown in FIG. 2, the drilled hole 37 is drilled to the position of the weakened part 35. Drilling or milling the machined hole 37 at least to the position of the weakened part 35 (and possibly past the weakened part), enables easier release of the second portion 33 of the rotational shaft from the first portion 32 of the rotational shaft 30. The final separation of the rotational shaft could be done by breaking the material left after machining during the first part of the stroke.

When the depth of the machined hole 37 is sufficient, the machining tool 201 can be stroked onto the bottom of the machined hole 37 in the core of the rotational shaft 30 until the rotational shaft 30 breaks at the weakened part 35 separating the second portion 33 from the first portion 32 of the rotational shaft 30.

Once the second portion 33 and the first portion 32 have been released or separated from each other, the machining unit 200 can be used in pushing the machining tool 201 onto a bottom of the machined hole 37 in the core of the rotational shaft 20. Since the valve stem 101 is connected to the linear shaft 40, which again is connected to the second portion 33 of the rotational shaft 30, the valve stem 101 will also be moved thereby operating the valve 100 upon pushing the machining tool 201 towards the bottom of the machined hole 37. As such, the valve 100 can be operated to a desired position.

Figure 3:
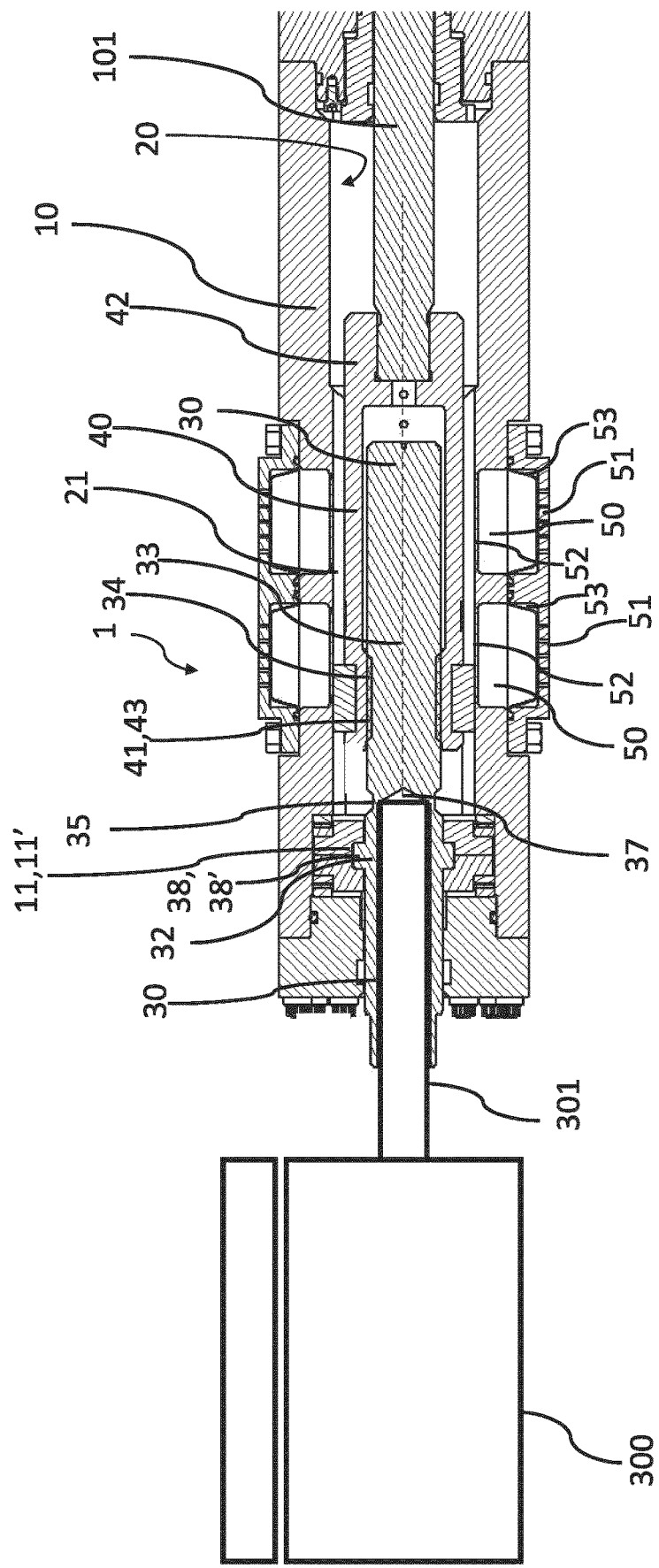
FIG. 3 shows a second method of overriding the valve operating device in FIG. 1 by releasing a second portion of a rotational shaft from a first portion of the rotational shaft using a machining unit for machining out a core of the rotational shaft and a hydraulic override tool for stroking of the rotational shaft.

FIG. 3 shows a second method of overriding the valve operating device 1 in FIG. 1 by releasing a second portion 33 of a rotational shaft 30 from a first portion 32 of the rotational shaft 30 using a machining unit 200 for machining out a core of the rotational shaft 30 and a hydraulic override tool 300 for stroking of the rotational shaft 30. The method for machining out the core of the rotational shaft 30 is similar to the method described in relation to FIG. 2 and will not be repeated herein. However, instead of stroking the machining tool 201 onto the bottom of the machined hole 37 in the core as in FIG. 2, the machining unit 200 with machining tool 201 is replaced by a hydraulic override tool 300. The hydraulic override tool 300 comprises a stroke piston 301. The stroke piston 301 is positioned into the machined hole 37 and the hydraulic override tool 300 is used to stroke the stroke piston 301 against the bottom of the machined hole 37 until the second portion 33 of the rotational shaft 30 separates from the first portion 32 of the rotational shaft 30 by separating or breaking at the weakened part 35.

Once the second portion 33 and the first portion 32 have been released or separated from each other, hydraulic override tool 300 can be used in pushing the stroke piston 301 onto the bottom of the machined hole 37 in the core of the rotational shaft 20. Since the valve stem 101 is connected to the linear shaft 40, which again is connected to the second portion 33 of the rotational shaft 30, the valve stem 101 will also be moved thereby operating the valve 100 upon pushing the stroke piston 301 towards the bottom of the machined hole 37. As such, the valve 100 can be operated to a desired position.

Figure 4:
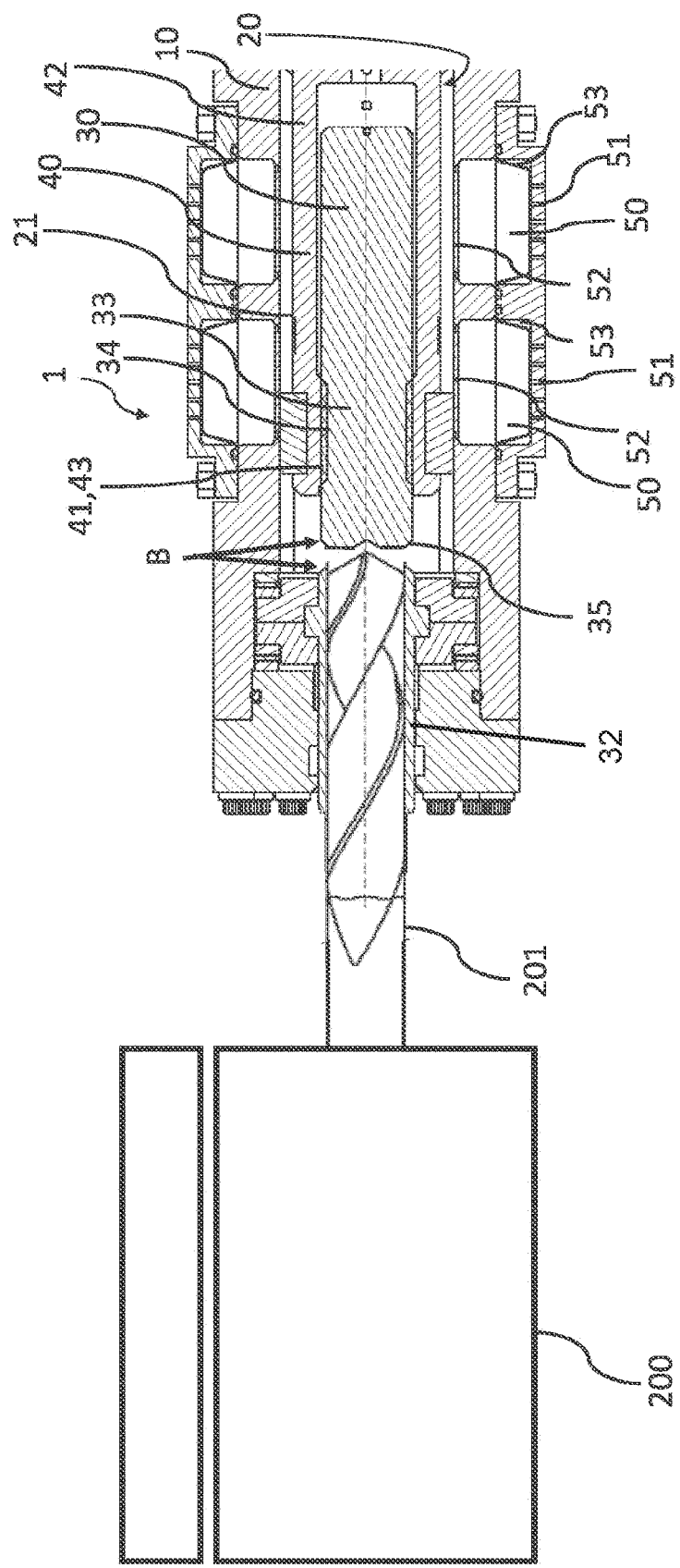
FIG. 4 shows a third method of overriding the valve operating device in FIG. 1 by releasing a second portion of a rotational shaft from a first portion of the rotational shaft using a machining unit for machining out a core of the rotational shaft until the second portion releases from the first portion.

FIG. 4 shows a third method of overriding the valve operating device 1 in FIG. 1 by releasing a second portion 33 of a rotational shaft 30 from a first portion 32 of the rotational shaft 30 using a machining unit 200 with a machining tool 201 for machining out a core of the rotational shaft 30 until the second portion 33 releases from the first portion 32.

Arrows B indicate that the second portion 33 and the first portion 32 of the rotational shaft 30 have been released or separated from each other at the weakened part 35, i.e. the rotational shaft 30 has been cut or machined into two parts.

In order to be able to machine out, such as by e.g. using a drill bit 201 or milling tool 201, the second portion 33 from the first portion 32, the diameter of the machining tool 201 used in the method of FIG. 4 is larger than the machining tool 201 in FIG. 2. The diameter of the machining tool 201 can for example be at least of the same size as an outer diameter of the weakened part 35, or it can be larger or slightly smaller.

Similarly as for the method in FIG. 2, once the second portion 33 and the first portion 32 have been released or separated from each other, the machining unit 200 can be used in pushing the machining tool 201 onto a bottom of the machined hole 37 in the core of the rotational shaft 20. Since the valve stem 101 is connected to the linear shaft 40, which again is connected to the second portion 33 of the rotational shaft 30, the valve stem 101 will also be moved thereby operating the valve 100 upon pushing the machining tool 201 towards the bottom of the machined hole 37. As such, the valve 100 can be operated to a desired position.

Figure 5:
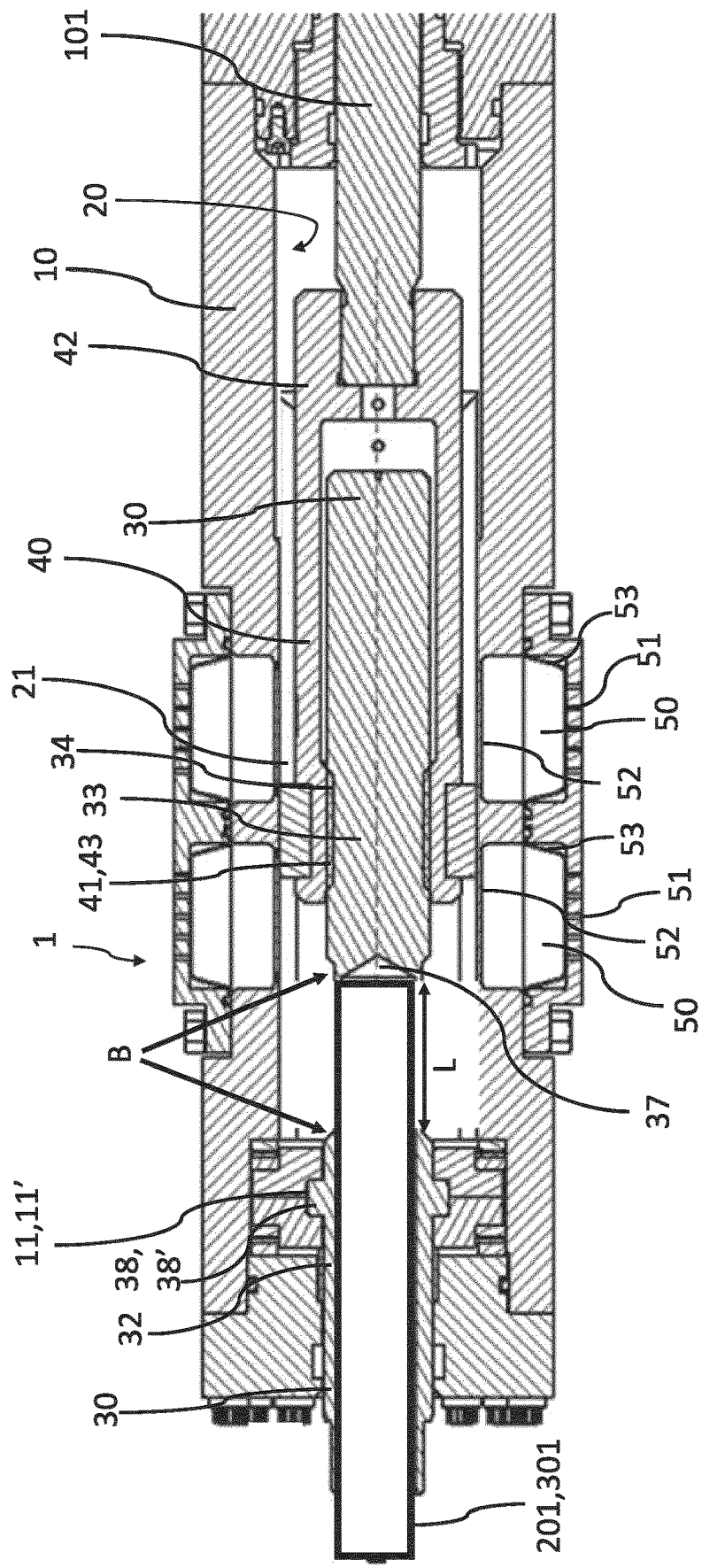
FIG. 5 shows the situation after the second portion of the rotational shaft has been released from the first portion of the rotational shaft independently of using the method disclosed in FIG. 2, FIG. 3 or FIG. 4.

FIG. 5 shows the situation after the second portion 33 of the rotational shaft 30 has been released or separated from the first portion 32 of the rotational shaft 30 independently of using the method disclosed in FIG. 2, FIG. 3 or FIG. 4. The arrows B indicate that the second portion 33 and the first portion 32 of the rotational shaft 30 have been released or separated from each other at the weakened part 35 over a distance L, i.e. the rotational shaft 30 has broken into two parts and the valve 100 (not shown in FIG. 5) can be opened.

Figure 6:
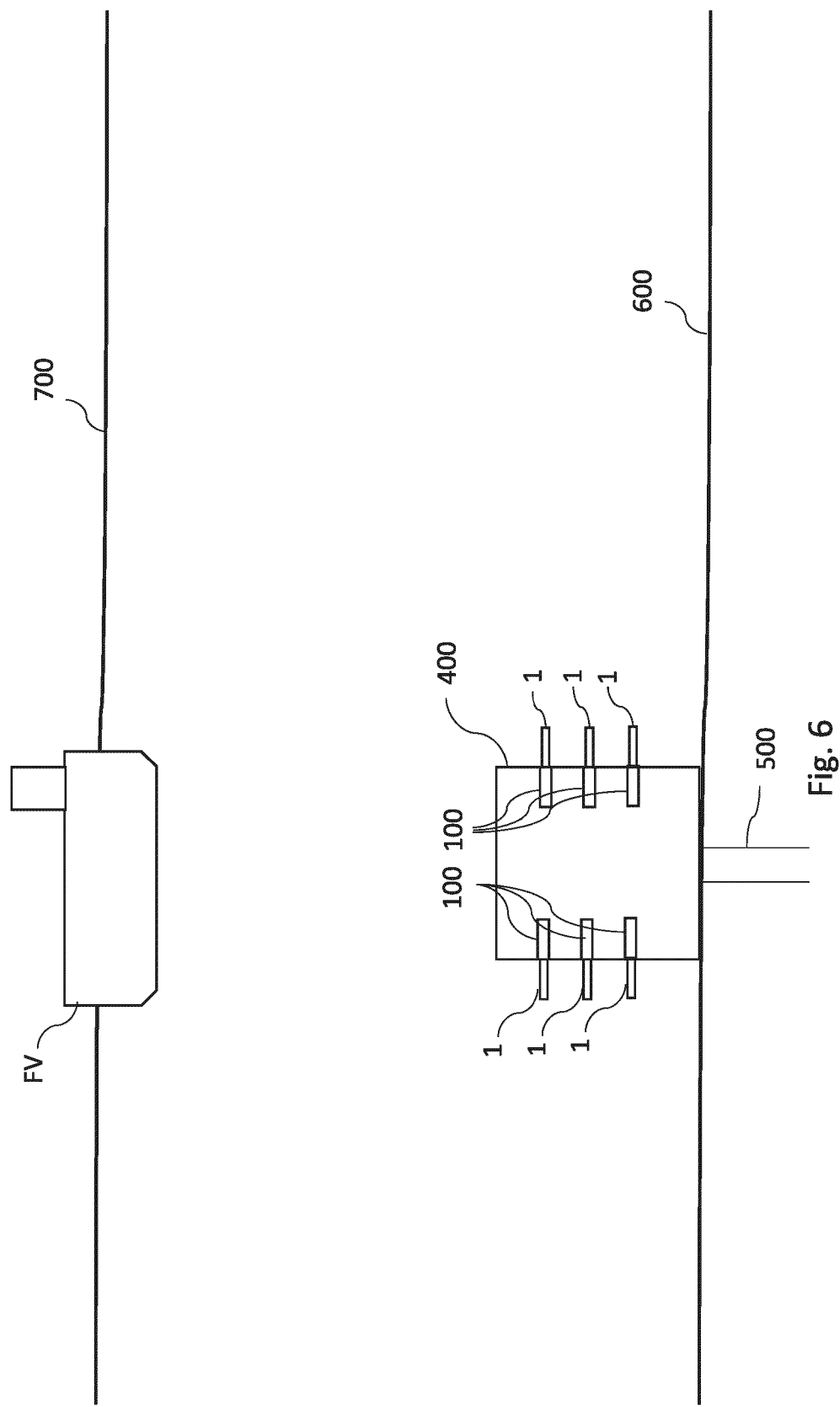
FIG. 6 is a schematic overview of a subsea valve tree comprising a number of subsea valves, where each of the valves are connected to a valve operating device.

FIG. 6 is a schematic overview of a subsea valve tree 400 comprising a number of subsea valves 100, where each of the valves 100 are connected to a valve operating device 1. The subsea valve tree 400 is arranged on a seabed 600 below a body of water. A floating vessel FV floats on a surface 700 of the body of water. The valve tree 400 is arranged above a subsea well 500.

Figure 7:
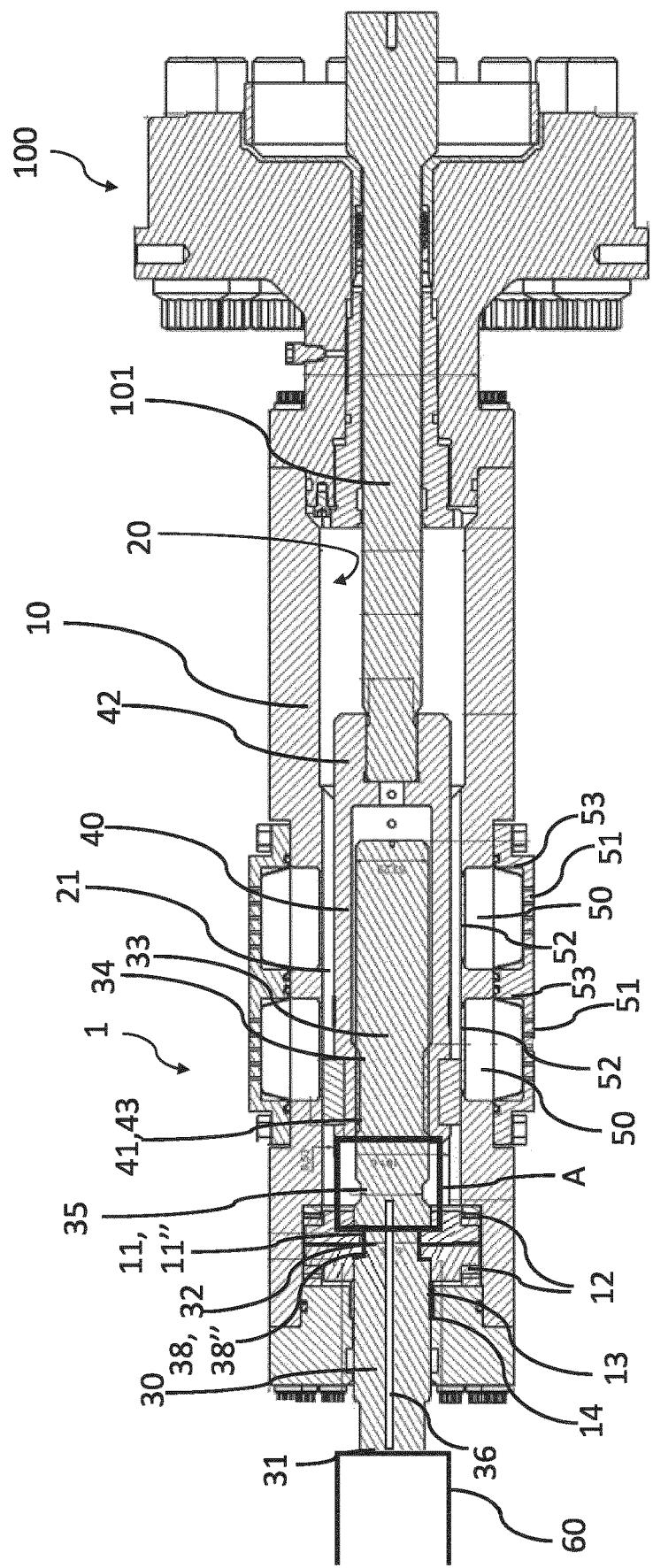
FIG. 7 is an example of a valve operating device with an alternative connection between the rotational shaft and the housing compared to FIGS. 1-5.

FIG. 7 is an example of a valve operating device 1 with an alternative connection between the rotational shaft 30 and the housing 10 compared to FIGS. 1-5. All of the elements of the valve operating device 1 are identical to the valve operating device 1 in FIGS. 1-5, except that the radial rib and recess are on the opposite parts. I.e., as seen in FIG. 7, the thrust bearings 12 comprises a connection part in the form of a rib 11" and the first portion 32 of the rotational shaft 30 comprises a connection part in the form of a recess 38" for receiving or accommodating the rib 11". In this example, the recess 38" in the first portion of the rotational shaft 30 may function as a weakened part and thus a dedicated weakened part may be superfluous.

Figure 8:
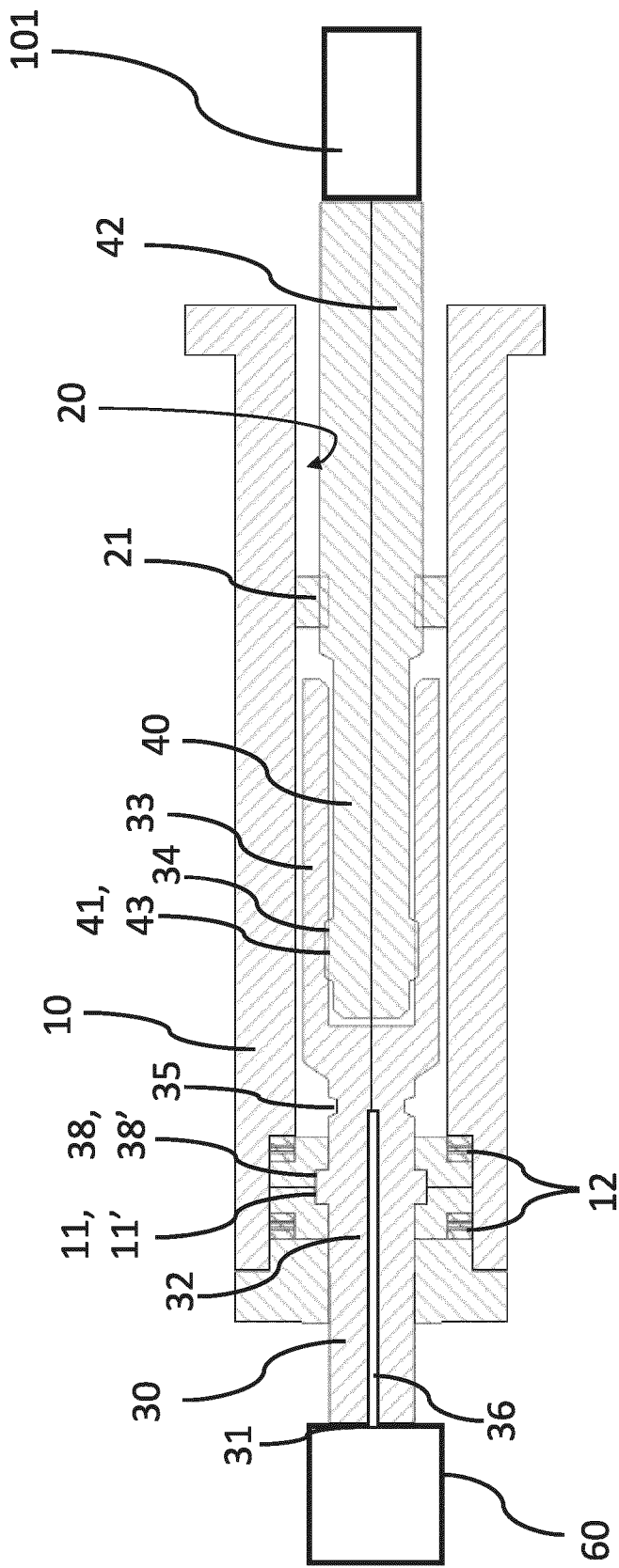
FIG. 8 shows an example of a valve operating device as shown in FIG. 1 but where the rotational shaft is an outer shaft with internal threads and the linear shaft is an inner shaft with external threads.

FIG. 8 shows an example of a valve operating device 1 as shown in FIG. 1 but where the rotational shaft 30 is an outer shaft with internal threads 34 and the linear shaft 40 is an inner shaft with external threads 43. Some of the components of the valve operating device 1 in FIG. 1 have been omitted in FIG. 8 in order to better illustrate the difference between the example of FIG. 8 and the example in FIG. 1, including e.g. the valve 100, parts of the valve stem 101, the connection between the rotational shaft 30 and the housing 10, as well as the system for pressure equalizing the chamber 20.

As seen in FIG. 8, the threaded portion 34 of the rotational shaft 30 encircle the threaded portion 43 of the linear shaft 40. I.e. threaded portion 34 of the rotational shaft 30 is internal threads 34 and the threaded portion 43 of the linear shaft 40 is external threads 43. For this to be possible, the second portion 33 of the rotational shaft 30 is arranged radially outside the first portion 41 of the linear shaft 40. The linear guide 21 which prevents rotation of the linear shaft 40 relative the housing 10 is arranged to the right of where the rotational shaft 30 ends.

It should be recognized that, while the present invention has been described in relation to the preferred embodiments thereof, those skilled in the art may develop a wide variation of structural and operational details without departing from the principles of the invention as defined in the attached claims.

| | List of references: |
|---|---|
| 1 | Valve operating device |
| 10 | Housing |
| 11 | Connection part of thrust bearings/Recess |
| 11' | Recess |
| 11" | Rib |
| 12 | Thrust bearings |
| 13 | Groove |
| 20 | Chamber |
| 21 | Linear guide |
| 30 | Rotational shaft |
| 31 | External interface |
| 32 | First portion of rotational shaft |
| 33 | Second portion of rotational shaft |
| 34 | Threaded portion of rotational shaft |
| 35 | Weakened part |
| 36 | Pre-machined hole |
| 37 | Machined hole/drilled hole/milled hole |
| 38 | Connection part of rotational shaft/Radial rib |
| 38' | Radial rib |
| 38" | Recess |
| 40 | Linear shaft |
| 41 | First portion of linear shaft |
| 42 | Second portion of linear shaft |
| 43 | Threaded portion of linear shaft |
| 50 | Bellows chamber |
| 51 | Outer drainage holes |
| 52 | Inner drainage holes |
| 53 | Bellows |
| 60 | Actuator |
| 100 | Valve |
| 101 | Valve stem |
| 200 | Machining unit/drilling unit/milling unit |
| 201 | Machining tool/drill bit/milling tool |
| 300 | Hydraulic override tool |
| 301 | Stroke piston |
| 400 | Valve tree/X-mas tree |
| 500 | Well |
| 600 | Seabed |
| 700 | Surface of body of water |
| A | Indication of area of weakened part |
| B | Indicating that the rotational shaft has broken into two parts |
| FV | Floating vessel |

-continued

List of references:

| | |
|---|---|
| L | Distance between released first and second portions |
| V | Vessel |

The invention claimed is:

1. A valve operating device for operating a subsea valve, the valve operating device comprising:
   a housing;
   thrust bearings supported by the housing, the thrust bearings comprising a connection part;
   a chamber within the housing, the chamber comprising a first part of a linear guide;
   a rotational shaft comprising a first end having an external interface and being located outside the chamber and the housing and a second end located inside the chamber, the rotational shaft comprising a first portion having a connection part connected to the connection part of the thrust bearings to form a connection therebetween which allows rotational movement of the rotational shaft while preventing axial movement of the rotational shaft relative to the housing, a second portion having a threaded portion and being arranged inside the chamber, and an intermediate portion located between the first portion and the second portion; and
   a linear shaft arranged within the chamber, the linear shaft comprising a first portion and a second portion, the first portion having a threaded portion interacting with the threaded portion of the rotational shaft to form a threaded connection which translates rotational movement of the rotational shaft to linear movement of the linear shaft, and the second portion being connectable to a valve stem which operates the valve, wherein the linear shaft also comprises a second part of the linear guide, the first and second parts of the linear guide preventing rotation of the linear shaft relative to the housing;
   wherein the rotational shaft comprises a pre-machined hole extending from the first end of the rotational shaft and along a center axis of the rotational shaft over a part of an axial length of the rotational shaft.

2. The valve operating device according to claim 1, wherein the pre-machined hole extends to or past the connection part of the rotational shaft.

3. The valve operating device according to claim 1, wherein the intermediate portion comprises a weakened part.

4. The valve operating device according to claim 3, wherein the weakened part is positioned within the chamber.

5. The valve operating device according to claim 3, wherein the weakened part is formed by a reduction in an outer diameter of the rotational shaft.

6. The valve operating device according to claim 5, wherein the connection part of the rotational shaft comprises a recess with a reduced diameter, and wherein the weakened part is formed by the recess.

7. The valve operating device according to claim 4, wherein the weakened part is arranged at the connection part of the rotational shaft or at a position further away from the external interface than the connection part of the rotational shaft.

8. A subsea valve tree comprising a subsea valve and a valve operating device according to any of claims 1-7.

9. A method of overriding a malfunctioning valve operating device according to claim 1, wherein the method comprises the steps of:
   connecting a machining unit with a machining tool to the external interface of the rotational shaft;
   machining a hole in a core of the rotational shaft guided by the pre-machined hole at least until a tip of the machining tool is at or close to the connection between the connection part of the thrust bearings and the connection part of the rotational shaft;
   releasing the second portion of the rotational shaft from the first portion of the rotational shaft, and thus the housing, to thereby allow linear movement of the rotational shaft;
   pushing onto a bottom of the machined hole in the core of the rotational shaft, and thus the valve stem connected to the valve, until the valve is operated to a desired position.

10. The method according to claim 9, wherein the step of releasing the second portion of the rotational shaft from the first portion of the rotational shaft comprises:
    providing a hydraulic override pushing tool with a stroke piston and bringing an end of the stroke piston in contact with the bottom of the machined hole; and
    stroking the stroke piston onto the bottom of the machined hole until the rotational shaft breaks or separates.

11. The method according to claim 9, wherein the step of releasing the second portion of the rotational shaft from the first portion of the rotational shaft comprises:
    stroking the machining tool onto the bottom of the machined hole until the rotational shaft breaks or separates.

12. The method according to claim 9, wherein the step of releasing the second portion of the rotational shaft from the first portion of the rotational shaft comprises:
    machining out the core until the second portion is separated from the first portion.

13. The method according to claim 9, wherein the method comprises, prior to the step of connecting the machining unit with the machining tool to the external interface of the rotational shaft:
    removing an actuator and/or a motor connected to the external interface.

14. A valve operating device for operating a subsea valve, the valve operating device comprising:
    a housing;
    thrust bearings supported by the housing, the thrust bearings comprising a connection part;
    a chamber within the housing, the chamber comprising a first part of a linear guide;
    a rotational shaft comprising a first end having an external interface and being located outside the chamber and the housing and a second end located inside the chamber, the rotational shaft comprising a first portion having a connection part connected to the connection part of the thrust bearings to form a connection therebetween which allows rotational movement of the rotational shaft while preventing axial movement of the rotational shaft relative to the housing, a second portion having a threaded portion and being arranged inside the chamber, and an intermediate portion located between the first portion and the second portion; and
    a linear shaft arranged within the chamber, the linear shaft comprising a first portion and a second portion, the first portion having a threaded portion interacting with the threaded portion of the rotational shaft to form a threaded connection which translates rotational movement of the rotational shaft to linear movement of the linear shaft, and the second portion being connectable to a valve stem which operates the valve, wherein the linear shaft also comprises a second part of the linear guide, the first and second parts of the linear guide preventing rotation of the linear shaft relative to the housing;

wherein the rotational shaft comprises a pre-machined hole extending from the first end of the rotational shaft and along a center axis of the rotational shaft over a part of an axial length of the rotational shaft; and wherein the intermediate portion comprises a weakened part.

\* \* \* \* \*